United States Patent
Nagornov

(10) Patent No.: US 9,157,724 B2
(45) Date of Patent: Oct. 13, 2015

(54) METHOD AND SYSTEM FOR DETERMINING VEHICLE WHEEL ALIGNMENT BASED ON THE APPLICATION OF SYSTEMS USING GYROSCOPIC SENSORS AND/OR MEMS ANGULAR RATE SENSORS (MEMS GYROSCOPES)

(71) Applicant: Vladimir Vladimirovich Nagornov, Kotelniki (RU)

(72) Inventor: Vladimir Vladimirovich Nagornov, Kotelniki (RU)

( * ) Notice: Subject to any disclaimer, the term of this patent is extended or adjusted under 35 U.S.C. 154(b) by 0 days.

(21) Appl. No.: 14/123,567

(22) PCT Filed: Oct. 26, 2012

(86) PCT No.: PCT/RU2012/000876
§ 371 (c)(1),
(2) Date: Dec. 3, 2013

(87) PCT Pub. No.: WO2014/065693
PCT Pub. Date: May 1, 2014

(65) Prior Publication Data
US 2014/0310967 A1    Oct. 23, 2014

(51) Int. Cl.
*G01B 5/255* (2006.01)
*G01B 21/26* (2006.01)

(52) U.S. Cl.
CPC .............. *G01B 5/255* (2013.01); *G01B 21/26* (2013.01); *G01B 2210/28* (2013.01)

(58) Field of Classification Search
CPC ... G01B 5/255; G01B 2210/28; G01B 11/275
USPC ........................................................ 33/203.18
See application file for complete search history.

(56) References Cited

U.S. PATENT DOCUMENTS

| | | | |
|---|---|---|---|
| 4,594,789 A * | 6/1986 | Marino et al. ................ 33/288 |
| 5,675,515 A * | 10/1997 | January ........................ 700/279 |
| 5,724,743 A * | 3/1998 | Jackson ........................ 33/288 |
| 6,219,134 B1 * | 4/2001 | Voeller et al. ............ 356/139.09 |
| 6,424,411 B1 * | 7/2002 | Rapidel et al. ........... 356/139.09 |
| 6,427,346 B1 * | 8/2002 | Stieff et al. .................... 33/203 |
| 6,684,516 B2 * | 2/2004 | Voeller et al. .............. 33/203.18 |
| 6,839,972 B2 * | 1/2005 | Jackson et al. ................ 33/286 |
| 7,089,150 B2 | 8/2006 | Phillips, III |
| 7,185,438 B2 * | 3/2007 | Paulsen et al. ................ 33/203 |
| 7,313,869 B1 * | 1/2008 | Rogers et al. .............. 33/203.18 |
| 7,621,054 B2 * | 11/2009 | Abke ......................... 33/203.18 |
| 7,908,751 B2 * | 3/2011 | Nobis et al. .................... 33/288 |
| 8,136,259 B2 * | 3/2012 | Torri et al. ................. 33/203.18 |
| 2005/0027473 A1 | 2/2005 | Davidson et al. |
| 2007/0255510 A1 | 11/2007 | Mabcosu et al. |

* cited by examiner

*Primary Examiner* — Christopher Fulton
(74) *Attorney, Agent, or Firm* — Nadya Reingand

(57) ABSTRACT

The invention relates to a method and system for determining vehicle wheel alignment, and namely, camber angles, total and individual toe and front wheel steering axis caster and tilt angles (caster and kingpin inclination), by measuring changes in wheel sensor angles from a predetermined position. Changes are measured using gyroscopic sensors or MEMS angular rate sensors (MEMS gyroscopes).

12 Claims, 7 Drawing Sheets

METHOD AND SYSTEM FOR DETERMINING VEHICLE WHEEL ALIGNMENT BASED ON THE APPLICATION OF SYSTEMS USING GYROSCOPIC SENSORS AND/OR MEMS ANGULAR RATE SENSORS (MEMS GYROSCOPES)

CROSS-REFERENCE TO RELATED APPLICATIONS

Current patent application is a National stage application from PCT application No. PCT/RU2012/000876 filed on Oct. 26, 2012.

FIELD OF THE INVENTION

The invention relates to for determining vehicle wheel alignment, and namely camber angles, total and individual toe and front wheel steering axis caster and tilt angles (caster and kingpin inclination), by measuring wheel sensor angles changes from a predetermined position. Changes are measured using gyroscopic sensors or MEMS angular rate sensors (MEMS gyroscopes).

BACKGROUND

The most common known electronic methods to measure wheel alignment are described below.

All well-known methods and systems for measuring of wheel alignment are based on using electronic and optoelectronic sensors with necessary stability in a given range of measured parameters; and those sensors are mounted directly on the wheel. The methods are based on application of electronic and optoelectronic sensor systems that form measuring units mounted on wheels of the vehicle. Measurement results obtained with measuring unit sensors are processed using a microprocessor system. Data from a preprocessing system is transmitted to a personal or industrial computer for final processing and information display. The measurement process is controlled from a computer or directly from wheel sensors. The methods ensure simultaneous control of all wheel angles. Measuring units contain a set of CCD sensors for measuring angles in horizontal plane (toe-in). Tilt sensors (inclinometers) are used to measure vertical angles in the longitudinal (steering wheel axle caster angle) and transverse (camber angle and steering wheel axle tilt angle) direction. The main disadvantages of the methods are: the complexity of measuring units and, as a consequence, a long time required to mount them on the wheels, high power consumption by wheel measuring unit sensors, low impact resistance of sensors, the requirement to align and center measuring units to the wheels of the vehicle.

Other known methods and systems are based on the use of computer vision. Measurements are performed by processing of measuring data obtained when using flash light emitters on special targets placed on the wheels of the vehicle and recording with video cameras the radiation pulses reflected from the targets. The video cameras and emitters are built using CCD technology. Measurement results obtained with the video cameras are processed using a microprocessor system. Measurement results are processed using a personal or industrial computer that are installed remotely. The main disadvantages of the method are: restrictions on spatial system configuration and sizes of the tested vehicles imposed to ensure target visibility by video cameras.

SUMMARY

The method addresses a vehicle wheel alignment, and namely, camber angles, total and individual toe and front wheel steering, axle caster and tilt angles (caster and kingpin inclination) by measuring changes in wheel sensor angles from a predetermined position. The changes are measured using gyroscopic sensors or MEMS angular rate sensors (MEMS gyroscopes). Initial known angle values are determined using a reference plane with the known vertical plane inclination. The reference plane inclination is measured at the initial installation of the wheel alignment determination system or constantly measured using a set of inclinometers and/or accelerometers that are fixed to the reference plane. The direction of the reference plane relative to the measured vehicle can be calculated by moving the vehicle forward with the wheel sensors mounted on it or by spinning non-steerable wheels of the vehicle. Before starting wheel alignment measurements, wheel sensors are mounted on the reference surface at special mounting sites, which have a known orientation relative to the reference plane. The system remembers the spatial position of wheel sensors and, since the reference plane inclination is known, the system calculates the absolute plane inclination of wheel sensors. When removing wheel sensors from the reference plane and mounting them to the wheels of the vehicle, the system, based on changes in readouts from gyroscopic sensors or MEMS angular rate sensors (MEMS gyroscopes), calculates the wheel sensor plane inclination and the angle between the direction of the reference plane and the direction of the wheel sensor plane. When moving the vehicle in its rectilinear motion, wheel inclination plane is calculated and wheel disc curve (runout) is adjusted based on the dependence of changes in plane inclination of wheel sensors. Thus, vehicle camber angles are calculated. In addition, when moving the vehicle, based on the dependence of changes in the direction of the wheel sensor plane on the direction of the reference plane, the offset and nonparallel mounting of wheel sensors on the wheels is adjusted (compensation) and individual toe are determined, and the total toe for each axle is calculated by adding the values of individual toe for each axle. If it is impossible to move the vehicle forward, the described adjustment can be carried out by turning the wheels on the raised axles of the vehicle.

After compensation of wheel sensors mounting on the wheels and determining the wheel plane in space, the wheel plane is continuously monitored by wheel sensors when measuring and adjusting wheel alignment taking into account the described adjustment. When turning the steered wheels, front wheel steering axle caster and tilt angles (caster and kingpin inclination) are calculated using well-known methods based on changes in wheel plane inclination.

In general, the wheel alignment determination system of the vehicle consists of four wheel sensors, the reference plane, a computer and a receiving-transmitting device.

Wheel sensors include gyroscopic sensors or MEMS angular rate sensors (MEMS gyroscopes) which measure changes in wheel sensor angle in at least two orthogonal axles, thus allowing to uniquely determine the change in the wheel sensor plane (where the wheel sensor plane angle is a virtual plane formed by two vectors in space originating from one point that is used by the program to calculate angular parameters for measurements).

The reference plane is a precision surface with special mounting sites which have a known orientation relative to the reference plane and to which wheel sensors are mounted. The reference plane also includes a set of inclinometers and/or accelerometers that are fixed to the reference plane to determine inclination.

The receiving-transmitting device is designed for data exchange via a wire or radio communication channel between the computer, reference plane sensors and wheel sensors.

The computer is designed for system management and execution of measurement algorithms.

BRIEF DESCRIPTION OF THE DRAWINGS

The system consists of the following elements:
(1)—wheel alignment determination system wheel sensor;
(2)—reference surface;
(3)—operator input device;
(4)—information display device;
(5)—movable trolley.

The system consists of the following elements:
(1)—wheel alignment determination system wheel sensor;
(6)—guiding ramp;
(7)—turntable;
(8)—sliding plate;
(9)—reference surface mounting position;
(2)—reference surface;
(3)—operator input device;
(4)—information display device;
(5)—movable trolley.

Figure 3:
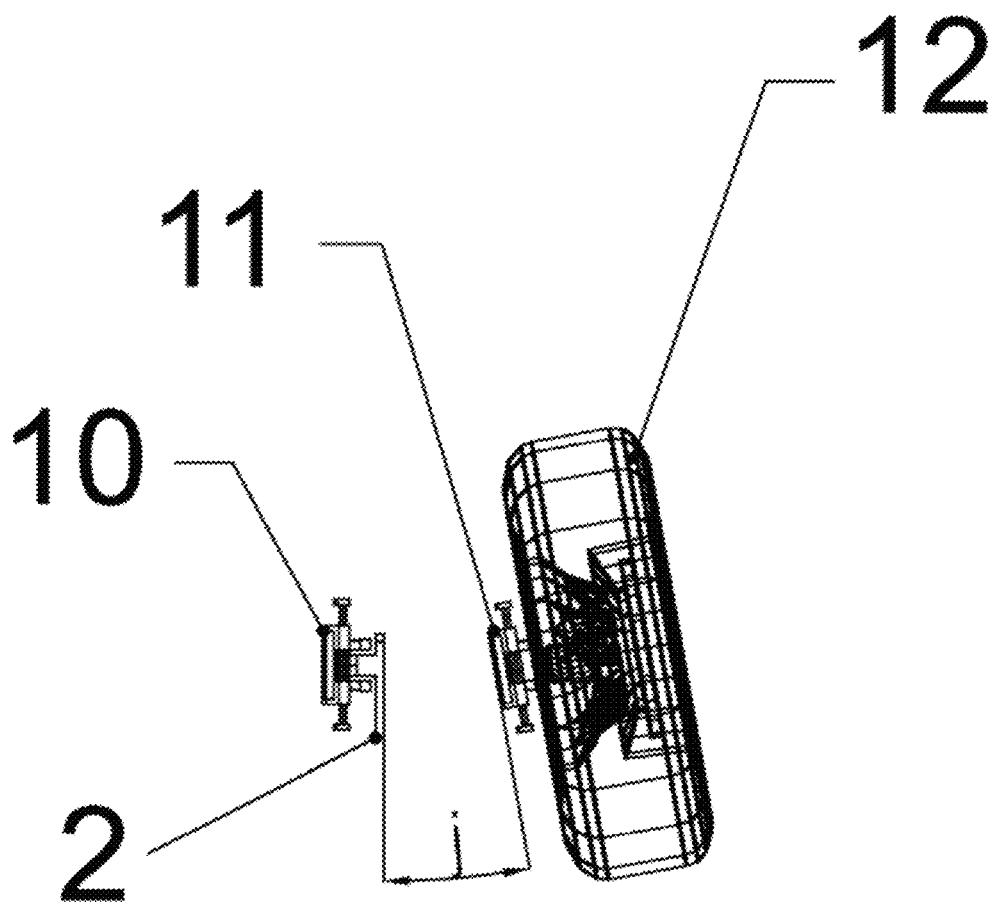

FIG. 3 shows a chart with changes in the wheel sensor plane angle.

The figure shows the following elements:
(10)—wheel alignment determination system wheel sensor mounted on the reference surface;
(11)—wheel alignment determination system wheel sensor mounted on the wheel of the vehicle;
(12)—wheel of the vehicle;
(2)—reference surface;
(J)—angle between the plane of the wheel sensor mounted on the reference plane and on the wheel during the measurements.

Figure 4:
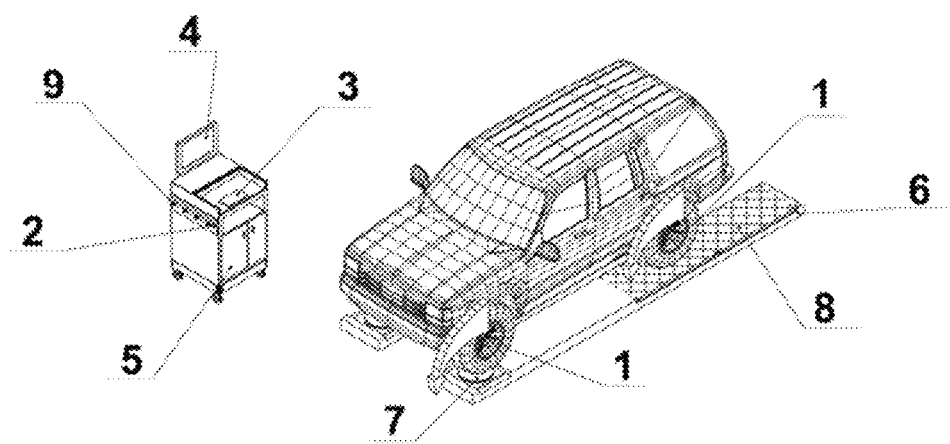

FIG. 4 shows the process of moving the vehicle forward to adjust wheel disc runout and non-parallel position of wheel sensor planes relative to wheel planes.

The figure shows the following elements:
(1)—wheel alignment determination system wheel sensor;
(6)—guiding ramp;
(7)—turntable;
(8)—sliding plate;
(9)—reference surface mounting position;
(2)—reference surface;
(4)—information display device;
(3)—operator input device;
(5)—movable trolley.

Figure 5:
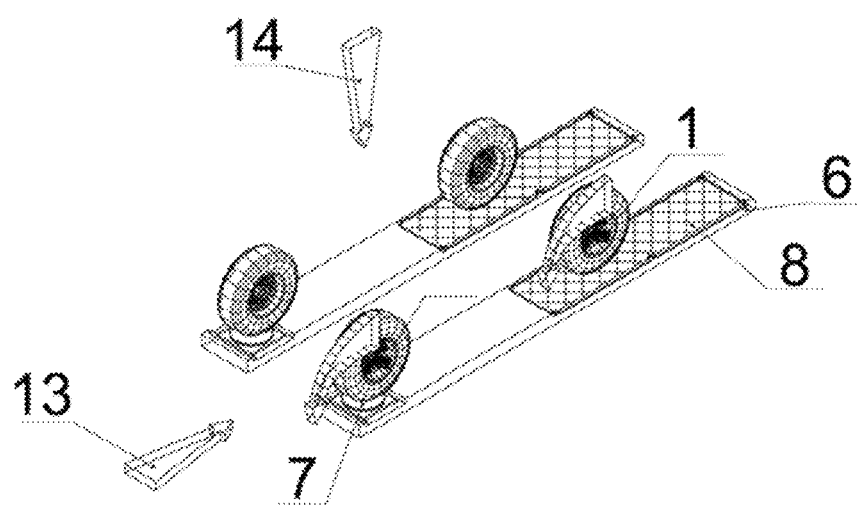

FIG. 5 shows the overall view of wheel sensors location in determining wheel alignment.

Figure 6:
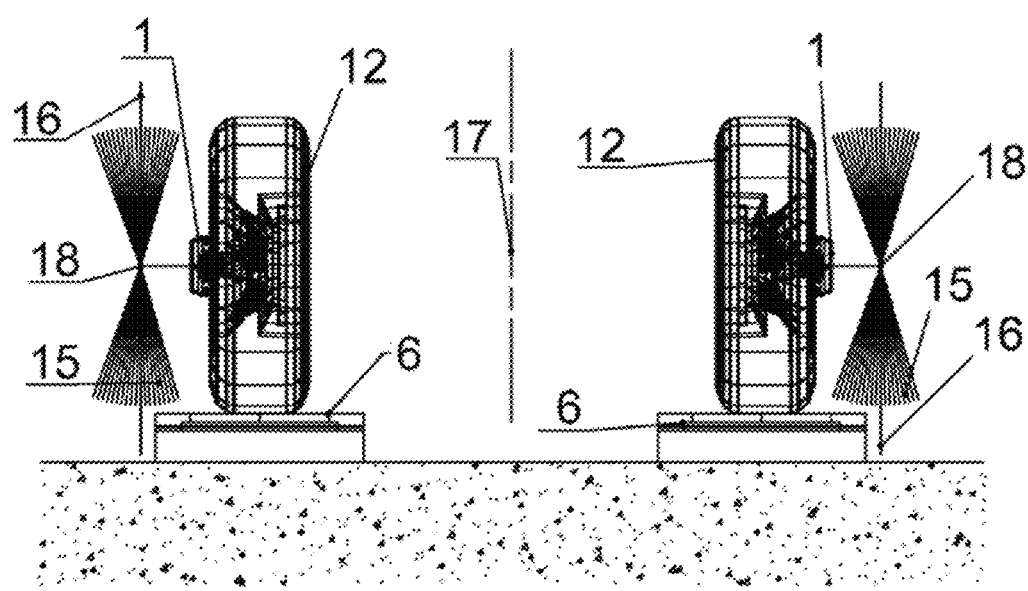

The figure shows the following elements:
(1)—wheel alignment determination system wheel sensor;
(6)—guiding ramp;
(7)—turntable;
(8)—sliding plate;
(13)—view for FIG. 6;
(14)—view for FIG. 7, FIG. 6 shows the wheel sensor plane inclination calculation chart relative to the horizontal surface.

The figure shows the following elements:
(6)—guiding ramp;
(12)—wheel of the vehicle;
(15)—range of projections of wheel sensor plane inclination to the horizontal surface of guiding ramps;
(16)—mean value of projections of wheel sensor plane inclination to the horizontal surface of guiding ramps;
(1)—wheel alignment determination system wheel, sensor;
(17)—perpendicular to the horizontal surface of guiding ramps;
(18)—wheel rotation axis.

Figure 7:
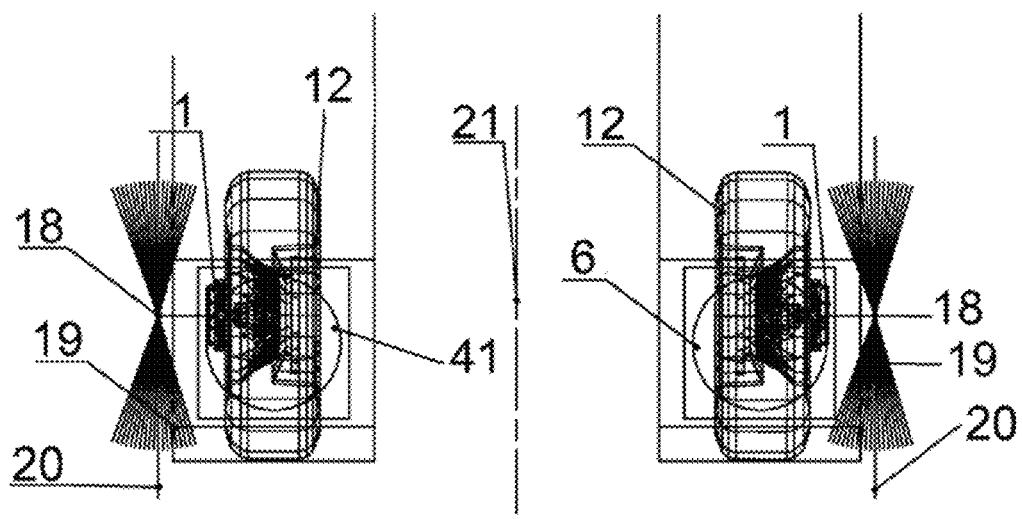

FIG. 7 shows the wheel sensor plane inclination calculation chart relative to rectilinear motion.

The figure shows the following elements:
(6)—guiding ramp;
(12)—wheel of the vehicle;
(19)—range of projections of wheel sensor plane inclination to the direction of rectilinear motion of the vehicle;
(20)—mean value of projections of wheel sensor plane inclination to the direction of rectilinear motion of the vehicle;
(1)—wheel alignment determination system wheel sensor;
(21)—vehicle rectilinear motion axis;
(18)—wheel rotation axis.

DETAILED DESCRIPTION OF THE PREFERRED EMBODIMENT

Figure 1:
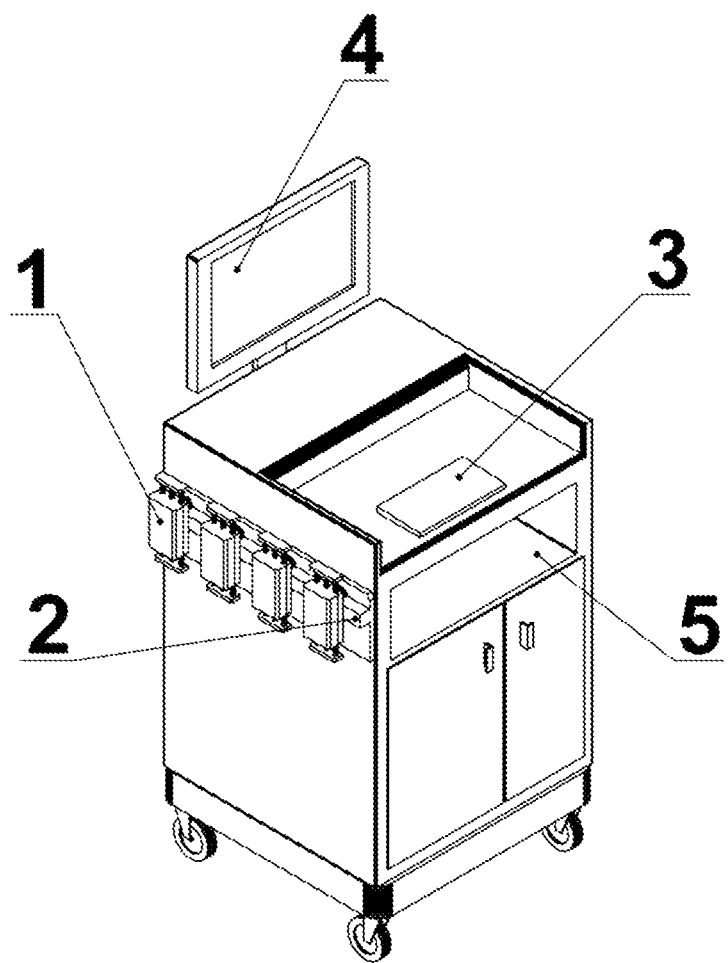
FIG. 1 shows the overall view of the vehicle wheel alignment determination system, based on a movable cabinet.
Figure 2:
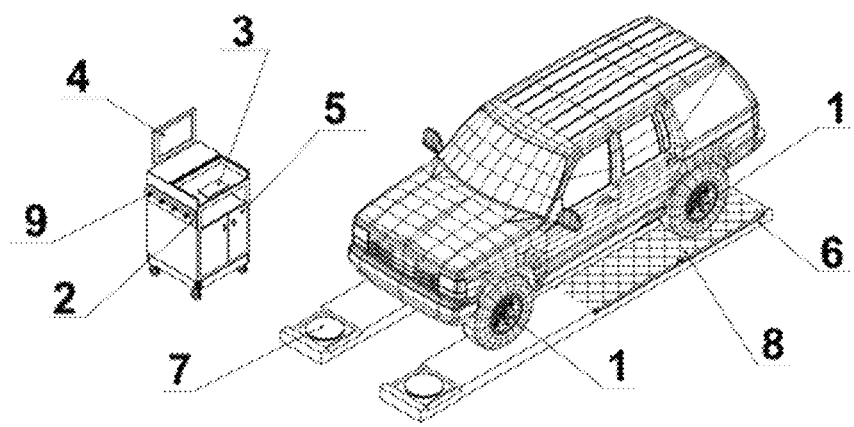
FIG. 2 shows the overall view of the vehicle wheel alignment determination system with the wheel sensors mounted on the vehicle.

To determine vehicle wheel alignment using the described method, one must carry out an initial mounting of wheel sensors (1) to determine the initial position of their planes in space relative to one another and the horizon, as shown in FIG. 1.

The basis of wheel sensors is gyroscopic sensors or MEMS angular rate sensors (MEMS gyroscopes). Moreover, despite the possibility of application of any type of gyroscopic sensors in the system. MEMS gyroscopes are more convenient to use in these systems due to the low weight and ease of processing of digital signals generated by them.

MEMS gyroscopes are angular rate sensors and, in addition to the mass produced MEMS acceleration sensors, allow to fully controlling the inertial movement. As a result of improved production technologies and, as a consequence, cost reduction and miniaturization of gyroscopes, the prospects of their industrial and, most important, consumer application have become obvious. MEMS gyroscopes combine a MEMS unit, which transforms the controlled parameter into a change in electric capacitance, and an application-specific integrated circuit (ASIC), which tracks the changing capacitance and generates an output signal. A MEMS gyroscope designed as a unit is a tuning fork type device. Its principle of operation is based on the Coriolis effect when rotating two silicon masses that produce fluctuations of equal amplitude but in opposite directions. The Coriolis force causes an orthogonal vibration, which leads to the displacement of fluctuating masses from the plane. The higher the angular speed the greater the displacement. This offset is controlled by the ASIC chip as a change in electric capacitance. MEMS gyroscopes can control rotation relative to one or several axes, relative to the longitudinal X axis (roll axis), transverse Y axis (pitch axis) and vertical Z axis (yaw axis). It should be noted, that this type of sensors, control the angular (rotational) velocity. Thus, in order to determine the controlled via the wheel sensors axle angles changing, the system has to constantly integrate the angular velocity readings. A gyroscopic sensor or a set of sensors is mounted on each wheel sensor to control the minimum rotation on two axes, allowing to uniquely determining the plane in space formed by gyroscopic sensor vectors; this virtual plane is called the wheel sensor plane. Information from wheel sensor measuring systems is transmitted with set intervals via a radio or wire channel to the computer control program for further processing.

For the initial mounting, after each activation of the wheel alignment determination system, wheel sensors (1) are mounted on the reference surface (2) with the known vertical plane inclination. Wheel sensors are also mounted on the reference plane when accumulating an error by gyroscopic sensors during measurements, but wheels sensors on the reference surface must not be calibrated during one vehicle wheel alignment measurement process. Reference plane inclination is measured at the initial installation of the wheel alignment determination system or constantly measured using a set of inclinometers and/or accelerometers that are fixed to the reference plane, in general, the reference surface is a precision metal plate with special mounting sites (2), which sizes and spatial orientation are known in advance. This plate is mounted either on a fixed surface in immediate proximity to the test sites or mounted on the movable system trolley (5). Also, the reference surface has special mounting sites for the wheel sensors designed to guarantee their spatial location on reference surface. Reference surface orientation information is transmitted in digital form from the set of inclinometers and/or accelerometers via a radio or wire channel to the computer with the processing program. Thus, there is a possibility to continuously monitor the position of the reference surface. When mounting wheel sensors on the respective mounting sites on the reference surface (1), the system determines the position of the wheel sensor plane relative to each other and, since the reference plane inclination is known, the system calculates the absolute plane inclination of wheel sensors. Generally, when measuring wheel alignment the vehicle must be located on a flat surface, for example, on guiding ramps (6). The surface tolerance value must be observed depending on the requirements of vehicle manufacturers. After the above determination of spatial location of wheel sensors, the sensors are mounted on the wheels of the vehicle. Permanent monitoring of changes in wheel sensor angles when mounting them on the wheels allows determining sensor plane inclination relative to the ground, as well as the relative position of wheel sensor planes. The position of the wheel sensor plane is calculated by adding its plane angles when mounting it (10) on the reference surface (2) to plane angles (J) when mounting it (11) on the wheel (12) of the vehicle.

For further measurements, the vehicle must be moved in its rectilinear motion as shown in FIG. 4. If necessary, the rectilinear motion of the vehicle can be controlled provided that front and rear axle wheels are positioned relative to each other. When moving the vehicle forward, the system calculates the mean value of inclination (16) from a range of projections of wheel sensor plane inclination to the horizontal surface of guiding ramps (6) based on changes in inclination of the wheel sensor plane (1). Thus, the system adjusts a possible curve of the wheel disc and non-parallel location of the wheel plane (12) relative to the wheel sensor plane. Wheel inclination (12) relative to the perpendicular to the horizontal surface (17) is calculated based on the adjustments made. The calculated value of wheel inclination to the perpendicular to the horizontal surface will be the camber angle. It should be noted that the range of projections of wheel sensor plane inclination to the horizontal surface of guiding ramps (15) can be obtained when turning the wheels of the vehicle 360 degrees or using mathematical modeling by the control program, by analyzing changes, by turning wheels at an angle less than 360 degrees. In addition, when moving the vehicle forward, the system calculates the mean value of wheel sensor plane inclination to the direction of rectilinear motion of the vehicle (21) from a range of projections of wheel sensor plane inclination to the direction of rectilinear motion of the vehicle based on changes in inclination of the wheel sensor plane (1). Thus, the system adjusts a possible curve of the wheel disc and non-parallel location of the wheel plane (12) relative to the wheel sensor plane. Wheel inclination (12) relative to the vehicle rectilinear motion axis (21) is calculated based on the adjustments made. The calculated value of wheel inclination to the direction of rectilinear motion of the vehicle will be the individual toe, and the total toe for each axle is calculated by adding the values of individual toe for each axle. It should be noted that the range of projections of wheel sensor plane inclination to the vehicle rectilinear motion axis (21) can be obtained when turning the wheels of the vehicle 360 degrees or using mathematical modeling by the control program, by analyzing changes, by turning wheels at an angle less than 360 degrees. If it is impossible to move the vehicle forward, the described adjustments can be carried out by turning the wheels on the raised axles of the vehicle.

Turntables (7) for the front and sliding plates (8) for the rear axles of the vehicle, applied at the moment, are used to ensure the technological processes of measurements, and namely to relieve stress from vehicle suspension elements when adjusting wheel alignment and changing caster. All further calculations are made taking into account the relative positions of wheel sensor planes and wheel planes. Given that the motion if rectilinear, and taking into account the known location of the wheel plane relative to the wheel sensor plane, the system determines the wheel plane angle relative to rectilinear motion. Therefore, individual toe are determined, and total toe for each axle are determined based on the sum of individual toe for each axle. When turning the steered wheels, front wheel steering axle caster and tilt angles (caster and kingpin inclination) are calculated based on changes in wheel plane inclination. After the measurement, wheel sensors are left on wheels if wheel alignment needs to be adjusted. By adjusting wheel alignment, the operator can see the change in wheel alignment values in real time.

Turntables (8) for the front and sliding plates (9) for the rear axles of the vehicle, applied at the moment, are used to ensure the technological processes of measurements, and namely to relieve stress from vehicle suspension elements when adjusting wheel alignment and changing caster. All further calculations are made taking into account the relative positions of wheel sensor planes and wheel planes. Given that the motion if rectilinear, and taking into account the known location of the wheel plane relative to the wheel sensor plane, the system determines the wheel plane angle relative to rectilinear motion. Therefore, individual toe are determined, and total toe for each axle are determined based on the sum of individual toe for each axle. When turning the steered wheels, front wheel steering axle caster and tilt angles (caster and kingpin inclination) are calculated based on changes in wheel plane inclination. After the measurement, wheel sensors are left on wheels if wheel alignment needs to be adjusted. By adjusting wheel alignment, the operator can see the change in wheel alignment values in real time.

Compared to the analogues, the application of this method and the wheel alignment determination system will allow to reduce the costs of the vehicle wheel alignment determination system as well as weight and power consumption of wheel sensors by using sensors based on MEMS technology; and lift the restrictions on spatial system configuration and sizes of the tested vehicles by using gyroscopic sensors.

The invention claimed is:
1. A method for determining vehicle wheel alignment, comprising:

placing a set of angle gyroscopic sensors on a reference surface, wherein the reference surface is not connected to a vehicle, and recording an initial angles values;

removing the sensors from the reference surface and placing them on wheels of the vehicle; one sensor on each wheel; recording measured angles values from the sensors placed on the wheels; the measured angle showing a difference of the sensor's angle on the wheel compared with the initial angle value for this sensor; and calculating a wheel alignment for at least one axle wheels of the vehicle from mutual position of the wheels sensors and the sensors of the reference surface; calculating a relative angular orientation of the wheels;

if needed, adjusting the relative angular wheels orientation to achieve an improved wheels alignment, while continuously checking the relative angular orientation of the wheels using a data from the sensors placed on the wheels.

2. The method of claim 1, wherein the sensors are MEMS angular rate sensors (MEMS gyroscopes).

3. The method of claim 1, wherein the reference surface is mounted on a rolling trolley.

4. The method of claim 3, wherein an angle of the reference surface inclination is constantly measured by a set of inclinometers and/or accelerometers-thus correcting the initial angle value used in calculations of the wheel alignment.

5. The method of claim 1, having at least four sensors, the method performing a four wheel alignment, wherein a relative angular orientation of each wheels of the vehicle is measured and adjusted.

6. A vehicle wheel alignment adjustment system, comprising:

a set of gyroscopic wheel sensors, each sensor measures an angle changes at least two orthogonal planes;

a reference plane designed as a precision surface with special mounting sites with a known orientation relative to the reference plane to which the sensors are mounted;

wherein the reference plane is not connected to the vehicle; initial angles are recorded when sensors placed on the mounting sites;

the sensors perform measurement of wheel angles when the sensors are placed on wheels; measured angles indicate an angle value difference from the initial angles values of the reference plane; the measured angles data is transmitted to a computer;

the computer executes a data processing algorithm resulting in a wheel alignment data displayed on a display;

the alignment includes a relative angular orientation of at least two wheels.

7. The system of claim 6, wherein the display is configured to show an alignment change when a wheel angle is changed thus facilitating the alignment adjustment.

8. The system of claim 6, wherein the data transmission is wireless.

9. The system of claim 6, wherein the reference plane is mounted on a rolling trolley.

10. The system of claim 9, wherein an angle of the reference plane inclination is constantly measured thus correcting the initial angle value used in calculations of the wheel alignment.

11. The system of claim 6, wherein an angle of the reference surface inclination is measured by a set of inclinometers and/or accelerometers.

12. The system of claim 6 having four sensors, the system performing measurement and alignment adjustment for all four wheels.

* * * * *